United States Patent
Cho et al.

(10) Patent No.: US 7,028,482 B2
(45) Date of Patent: Apr. 18, 2006

(54) PHEV (PNEUMATIC HYBRID ELECTRIC VEHICLE)

(75) Inventors: Chol-Seung Cho, Seoul (KR); Dae-Sik Ko, Seoul (KR)

(73) Assignee: Energine Corporation, Seoul (KR)

( * ) Notice: Subject to any disclaimer, the term of this patent is extended or adjusted under 35 U.S.C. 154(b) by 49 days.

(21) Appl. No.: 10/475,044

(22) PCT Filed: Apr. 17, 2002

(86) PCT No.: PCT/KR02/00706

§ 371 (c)(1),
(2), (4) Date: Jul. 12, 2004

(87) PCT Pub. No.: WO02/092373

PCT Pub. Date: Nov. 21, 2002

(65) Prior Publication Data

US 2004/0237517 A1     Dec. 2, 2004

(30) Foreign Application Priority Data

Apr. 17, 2001 (KR) ................. 2001-20350
Oct. 10, 2001 (KR) ................. 2001-62472

(51) Int. Cl.
*F01K 15/00* (2006.01)
(52) U.S. Cl. ............... 60/698; 60/407; 60/716
(58) Field of Classification Search .......... 60/409, 60/407, 370, 420, 435, 698, 718, 716, 413, 60/414; 180/165, 202, 65.2
See application file for complete search history.

(56) References Cited

U.S. PATENT DOCUMENTS

| 3,923,115 | A | * | 12/1975 | Helling | 180/65.2 |
| 4,042,056 | A | * | 8/1977 | Horwinski | 180/65.2 |
| 4,590,767 | A | * | 5/1986 | Gardner, Jr. | 60/668 |
| 4,596,119 | A | | 6/1986 | Johnson | |
| 6,176,807 | B1 | | 1/2001 | Oba et al. | |
| 6,311,797 | B1 | * | 11/2001 | Hubbard | 180/165 |
| 6,568,186 | B1 | * | 5/2003 | Zaleski | 60/698 |
| 6,857,985 | B1 | * | 2/2005 | Williams | 180/65.2 |

FOREIGN PATENT DOCUMENTS

| EP | 934844 A2 | 8/1999 |
| JP | 11-98607 A | 4/1999 |

* cited by examiner

*Primary Examiner*—Edward K. Look
*Assistant Examiner*—Igor Kershteyn
(74) *Attorney, Agent, or Firm*—Alston & Bird LLP

(57) ABSTRACT

A pneumatic hybrid electric engine includes an electric source, an air supply part for compressing air and storing the compressed air, a pneumatic engine part for generating power using air supplied from the air supply part, an electric engine part for generating power using electric power applied from the electric source, a power transmission part for transmitting the power generated by the pneumatic engine part and the electric engine part, and a control part for selectively operating the pneumatic engine part and the electric engine part so that the pneumatic and electric engines parts can be switched on the basis of a predetermined torque range.

18 Claims, 10 Drawing Sheets

PHEV (PNEUMATIC HYBRID ELECTRIC VEHICLE)

BACKGROUND OF THE INVENTION (a) Field of the Invention

The present invention relates to a pneumatic hybrid electric engine (PHEE) and, more particularly, to a PHEE that is a combination of a pneumatic engine and an electric motor engine, which can fully obtain initial start power by timely switching the power source from the pneumatic engine to the electric motor engine or vice versa according to the variation of the engine load.

(b) Description of the Related Art

Generally, an engine is a device for generating power that can be used for operating vehicles or ships. As the industry develops, a variety of engines have been proposed.

In the initial stages of the industrial revolution, steam engines had usually been used. However, since the steam locomotives or steam ships using such a steam engine use a coal for fuel, the energy efficiency is very low while emitting noxious fumes.

To solve the above problems, combustion engines using gasoline or diesel oil for fuel has been developed to improve the combustion efficiency and solve the problem of the air pollution. Such a combustion engine has been used for vehicle up-to-now.

However, in recent years, as the environment regulation has been increasingly tightened, a power generation system that can alleviate the air pollution has been required to replace the combustion engine. Accordingly, an engine using nonpolluting fuel such as electric energy has been briskly developed.

However, a vehicle provided with the engine using electricity has a problem in being commercialized due to the following reasons.

That is, the vehicle requires a large capacity of start power during the initial engine start. Accordingly, in the electric engine, the excessive current should be supplied to the motor during the initial engine start, resulting in the reduction of the life of the motor. In addition, when the vehicle runs an uphill for a long time, the excessive current is also supplied to the motor. This also causes the life of the motor to be reduced.

SUMMARY OF THE INVENTION

Therefore, the present invention has been made in an effort to solve the above-described problems. It is an objective of the present invention to provide a PHEE which is a combination of a pneumatic engine and an electric motor, whereby the engine is driven by the pneumatic engine at the initial start and by the electric engine during the running state, thereby reducing the air pollution.

It is another objective of the present invention to provide a PHEE that can provide an improved running ability on the uphill road by combining the pneumatic engine and the electric motor.

It is another objective of the present invention to provide a method for driving a PHEE, in which a variety of algorithms are used to stably maintain voltage and current applied to an engine and adjust the balance of the motor.

To achieve the above objectives, the present invention provides A pneumatic hybrid electric engine comprising an electric source; an air supply part for compressing air and storing the compressed air, the air supply part being connected to the electric source; a pneumatic engine part for generating power using air supplied from the air supply part, the pneumatic engine part being connected to the air supply part; an electric engine part for generating power using electric power applied from the electric source; a power transmission part for transmitting the power generated by the pneumatic engine part and the electric engine part; and a control part for selectively operating the pneumatic engine part and the electric engine part so that the pneumatic and electric engines parts can be switched on the basis of a predetermined torque range.

According to another aspect, the present invention provides a method for controlling a pneumatic hybrid electric engine, comprising the steps of displaying an error state when any one of parts is not normal after checking a battery voltage, a gear, a zero-point of an accelerator, and line states of a first electron clutch, a second electron clutch, an air valve, a compressor, and a compressor driving motor; driving the engine in a pneumatic engine mode after 1) solving the abnormal state, 2) applying the first electron clutch, 3) opening the air valve, and 4) supplying compressed air to a pneumatic engine part; driving the engine in an electric engine mode by 1) operating an electric engine part when the power generated in the pneumatic engine part is transmitted to a first pulley through the first electron clutch and a transmission and to a second pulley through a belt and an rpm of the second pulley is higher than a predetermined value or a vehicle speed is higher than a predetermined value, 2) releasing the first electron clutch, and 3) applying the second electron clutch; and converting the engine drive mode from the electric engine mode to the pneumatic engine mode by 1) determining if the motor is over-loaded, and 2) stopping the electric engine mode by outputting a signal when excessive current is applied to the motor.

DETAILED DISCLOSURE OF THE PREFERRED EMBODIMENTS

Preferred embodiments of the present invention will be described more in detail in conjunction with the accompanying drawings.

Figure 1:
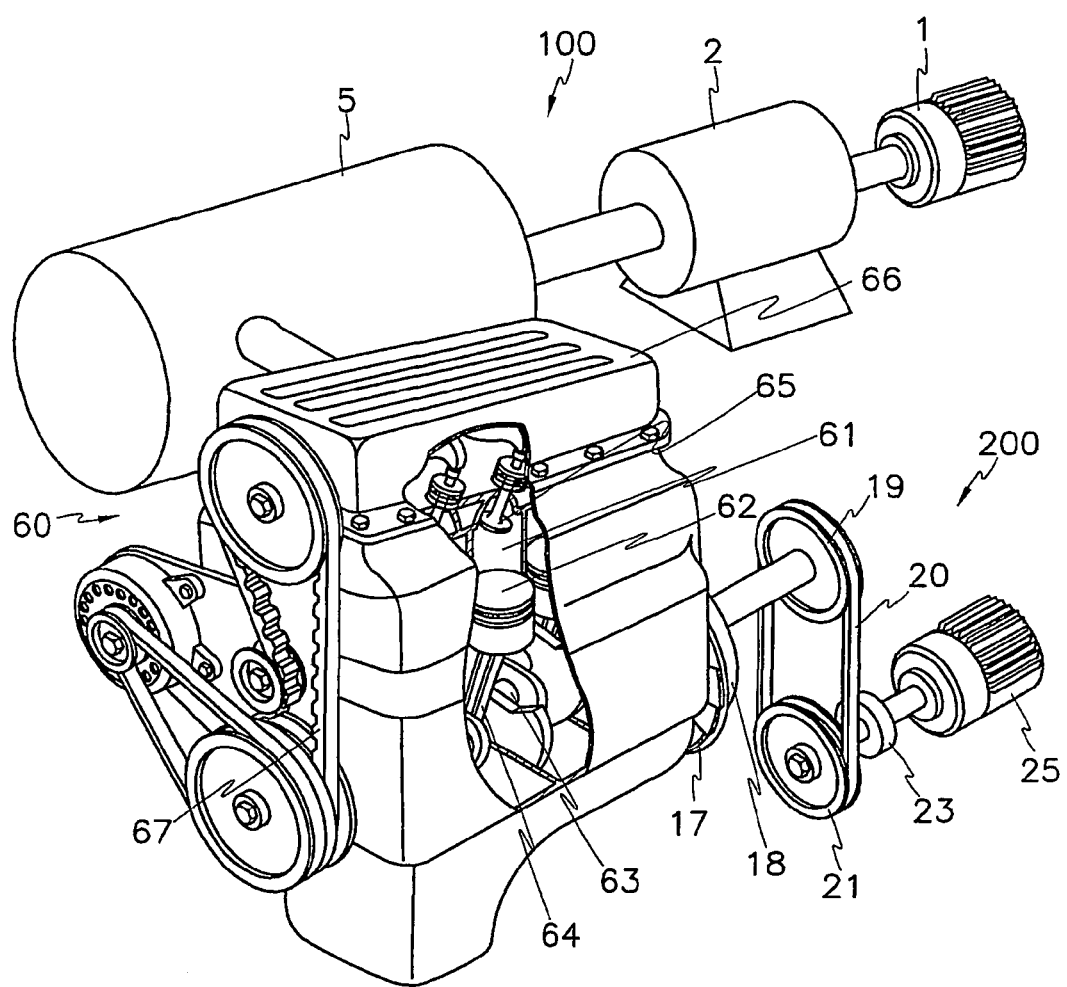
FIG. 1 is a schematic perspective view of a PHEE according to a preferred embodiment of the present invention.
Figure 2:
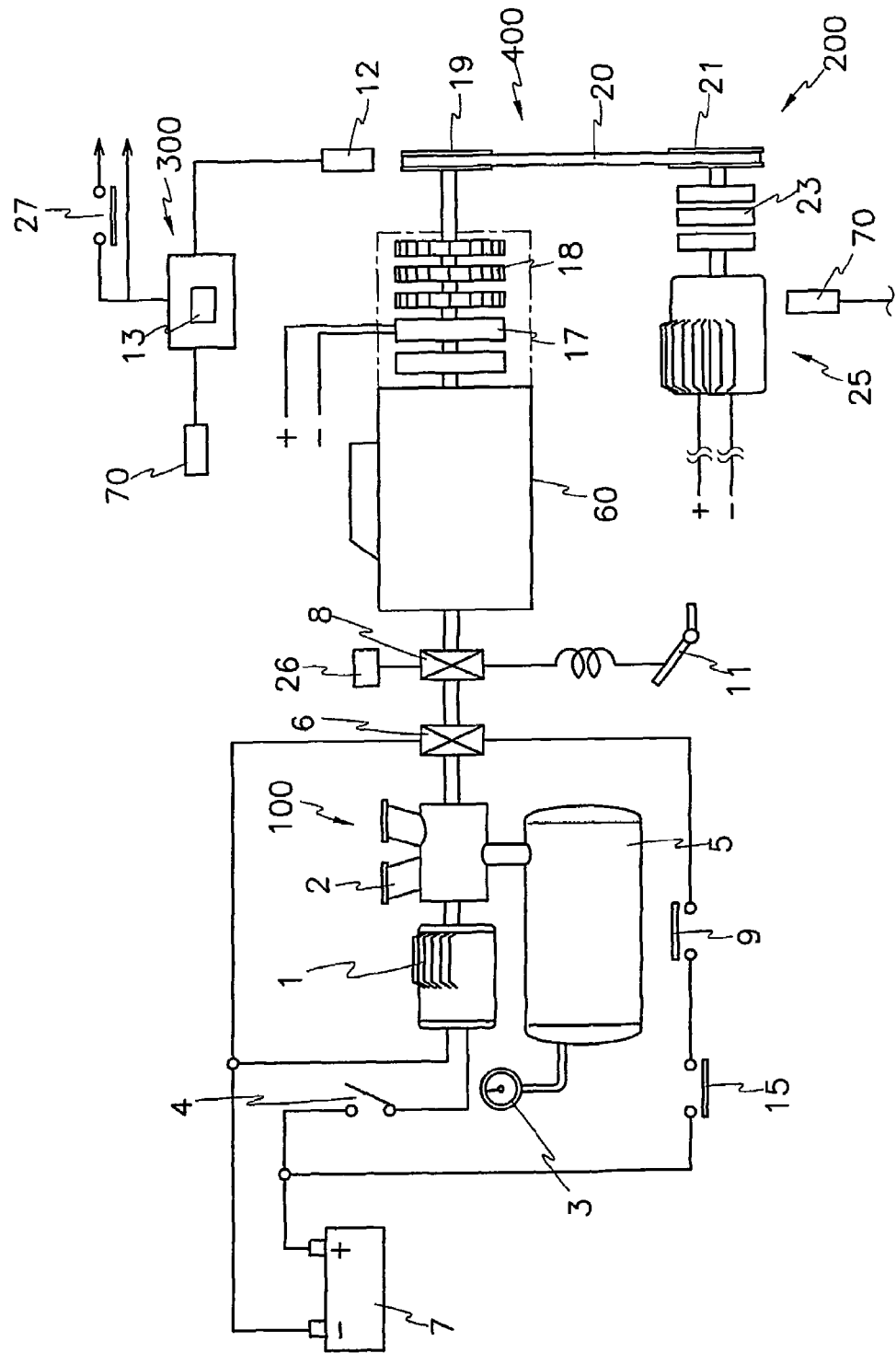
FIG. 2 is a view illustrating an air intake part of a PHEE depicted in FIG. 1.
Figure 4:
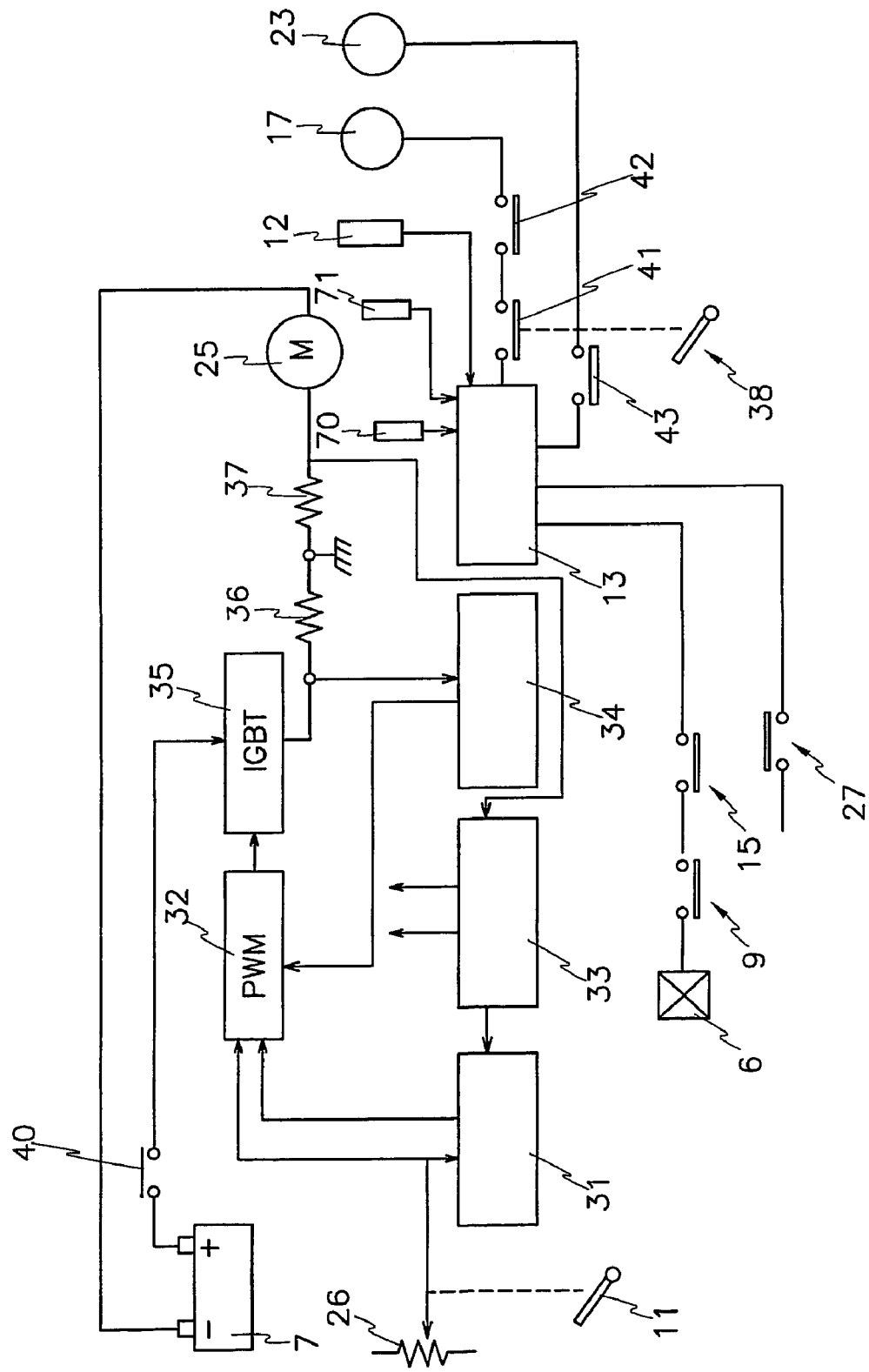
FIG. 4 is an electric circuit diagram of a PHEE according to a preferred embodiment of the present invention.

FIG. 1 shows a schematic perspective view of a PHEE according to a preferred embodiment of the present invention, FIG. 2 illustrates an air intake part of a PHEE depicted in FIG. 1, and FIG. 4 shows an electric circuit diagram of a PHEE according to a preferred embodiment of the present invention;

As shown in the drawings, the inventive PHEE (hybrid engine) comprises an air supplying part 100 for supplying compressed air, a pneumatic engine part 60 for generating power using the compressed air from the air supplying part 100, and an electric engine part 200 for generating power depending on the load of the pneumatic engine part 60.

In addition, the pneumatic engine part 60 and the electric engine part 200 are connected to a control part 200 so that they can be selectively controlled. That is, the control part 200 operates the pneumatic engine part 60 to obtain the sufficient start power at the staring operation and, when the RPM of an output shaft of the pneumatic engine part 60 is increased to a predetermined level, it operates the electric engine part 200.

As the air supply part 100 and the pneumatic engine part 60, an engine disclosed in Korea Patent No. 103015 to the applicant of this invention may be used.

That is, the air supply part 100 comprises an electric source 7, a compressor motor 1 electrically connected to the electric source 7, a compressor 2 connected to a rotational shaft of the motor 1 to compress the air, and a air tank 5 for storing the air generated by the compressor 2 and supplying the air to the pneumatic engine part 60.

The electric source 7 can be selected from the group consisting of a solar cell, a secondary battery, and a fuel cell. The solar cell and the secondary battery are more preferable. The compressor motor 1 may be formed of an alternating motor or more preferably a direct motor.

Accordingly, when the electric power is applied to the air supply part 100, the compressor motor 1 rotates to operate the compressor 2, thereby generating the compressed air. The compressed air is directed to the air tank 5 through a conduit and stored therein. At this point, an air pressure gauge 3 is mounted in the air tank 5 to identify the internal pressure. A pressure switch 4 is disposed between the electric source 7 and the compressor motor 1 to control the operation of the compressor 2 according to the variation of the internal pressure of the air tank 5.

That is, when the internal pressure of the air tank 5 is decreased to a predetermined level, the pressure switch 4 is turned to an on-state so that the electric power of the electric source is applied to the motor 2. When the motor 2 is operated, the compressor 2 is operated to supply the compressed air to the air tank 5.

In addition, when the internal pressure of the air tank 5 is increased to a predetermined level, the pressure switch 4 is turned to an off-state so that the electric power of the electric source cannot be applied to the motor 2. When the operation of the motor 2 is stopped, the supply of the air to the air tank 5 is also stopped.

The air tank 5 is connected to the pneumatic engine part 60 by an air conduit to supply the compressed air to the pneumatic engine 60. On the air conduit, an electron valve 6 and an air valve 8 are disposed to control the supply of the air to the pneumatic engine part 60, thereby controlling the operation of the pneumatic engine.

The pneumatic engine part 60 generates power by reciprocating the piston using the compressed air supplied from the air tank 5.

The air valve 8 is disposed spacing away from the electron valve 6 and connected to an accelerating pedal 11. Accordingly, the opening of the air valve 8 is varied according to the operation of the accelerating pedal 11. The output of the engine depends on the compressed air supplied through the air valve 8.

Such a pneumatic engine part 60 comprises a cylinder block 61 and plural pistons 62 reciprocally disposed in the cylinder block 61. The pistons 62 are connected to the crankshaft 62 by a connecting rod 64 to convert the linear motion of the piston 62 into a rotational motion.

In addition, a cylinder head 66 is coupled on a top of the cylinder block 61 and plural rocker arms (not shown) are mounted on the cylinder head 66. The rocker arms contact upper ends of corresponding intake/exhaust valves 65 to open and close the valves 65.

Accordingly, when the valve 65 is opened, the compressed air is introduced into the cylinder to push the piston 62 downward, thereby rotating the crankshaft 63 and ascending other pistons 62.

In addition, the crankshaft 63 is connected to a camshaft operating the rocker arms by a timing belt 67. Accordingly, as the crankshaft 63 rotates, the camshaft also rotates, thereby supplying the compressed air to the cylinder and reciprocating the pistons 62.

As the pistons 62 reciprocate, the crankshaft 63 rotates to generate power.

In addition, the pneumatic engine part 60 is connected to the electric engine part 200 by the power transmission part 400 to transmit power to the electric engine part 200.

That is, a first electron clutch 17 and a transmission 18 are mounted on a side of the pneumatic engine part 60. A first pulley 19 is mounted on an end of a rotational shaft projected from the transmission 18. The engine part 25 comprises a motor 25 connected to the electric source 7, a second electron clutch 23 mounted on a side of the motor 25, and a second pulley 21 connected to the second electron clutch 23. Accordingly, the first and second pulleys 19 and 21 are connected to each other by a belt 20.

The motor 25 is operated by receiving electric power from the electric source 7. In addition, a first temperature sensor 71 for detecting the temperature of the motor 25 is disposed in the vicinity of the motor 25. The detected temperature signal is transmitted to the control part 300.

An rpm sensor 12 for detecting the rpm of the second pulley 21 is disposed in the vicinity of the second pulley 21. The detected rpm signal is transmitted to a counter circuit 13 of the control part 13.

When the rpm is less than a predetermined level, the control part 300 operates the pneumatic engine part 60, and when higher than the predetermined level, operates the electric engine part 200.

The control part 300 comprises the counter circuit 13, an electron valve switch 9, and first and second counter switches 15 and 27. To detect the temperature of the control part 300, a second temperature detecting sensor 70 is provided.

The counter circuit 13 is connected to the rpm sensor 12 disposed in the vicinity of the first and second pulleys 19 and 21 of the engine control part 200.

Accordingly, when the rpm of the electric engine part 200 is less than a predetermine level, the electric signal of the rpm sensor is transmitted to the counter circuit 13 to open the first counter switch 15 and close the electron valve switch 9, thereby operating the electron valve 6. As a result, the compressed air is supplied from the air supply part 100 to the pneumatic engine part 600 to generate the power.

In addition, when the rpm of the electric engine part 200 is higher than the predetermined level, the electric signal of the rpm sensor 12 is transmitted to the counter circuit 13 to close the first counter switch 15 and open the electron valve switch 9, thereby stopping the operation of the electron valve 6 to stop the operation of the pneumatic engine part 60.

When the first counter switch 15 is closed, the second counter switch 27 is operated by the control part 300. As a result, the electron valve 6 is turned to an off-state to operate the electric engine part 200.

That is, as the electric power is applied from the electric source 7 to the motor 25, the engine is converted into an electric engine mode where the engine is operated by the electric engine part 200.

As described above, the pneumatic engine part 60 and the electric engine part 200 are selectively operated depending on the engine rpm detected by the rpm sensor.

As another embodiment, when the inventive hybrid engine is installed in a vehicle, the pneumatic engine 60 and the electric engine 200 can be selectively operated depending on the vehicle speed by being connected to a speed meter of the vehicle.

That is, when the vehicle speed is less than 21 km/h, the pneumatic engine part 60 is operated, and higher than 21 km/h, operated the electric engine part.

In addition, when the rpm is higher than the predetermined level, the counter circuit 13 connects a first transmission switch 41 to release the first electron clutch 17, thereby disconnecting the power transmission between the pneumatic engine part 60 and the transmission. As a result, the motor 25 transmits the power by the second electron clutch 23.

The counter circuit 13 is connected to second and third transmission switches 42 and 43 to selectively apply the first and second electron clutches 17 and 23 in response to the gear shifting operation.

That is, when the pneumatic engine part 60 is operated, the second transmission switch 42 releases the first electron clutch 17 to disconnect the power transmission between the pneumatic engine part 60 and the transmission 18.

When the electric engine part 200 is operated, the third transmission switch 43 releases the second electron clutch 23 for the gear shifting operation, decoupling the power transmission between the electric engine part 200 and the transmission.

Furthermore, the hybrid engine is designed to adjust the speed of the vehicle by adjusting the output using the accelerating pedal 11.

The accelerating pedal 11 is electrically connected to a variable resistor 26 connected to the motor 25 of the electric engine 200 through a pulse oscillating circuit 32 and a thyristor 35. Accordingly, when the hybrid engine is operated by the electric engine part 200, as the accelerating pedal 11 is depressed, the resistance of the variable resistor 26 is varied to enlarge the width of the pulse generated by the pulse oscillating circuit 32, thereby increasing the voltage supplied to the motor 25 to increase the motor rpm.

That is, as the motor rpm can be adjusted according to the variation of the resistance, the vehicle speed can be controlled.

As described above, the hybrid engine adjusts the engine output by operating the air valve 8 in the pneumatic engine mode and by the variable resistor 26 in the electric engine mode.

Figure 3:
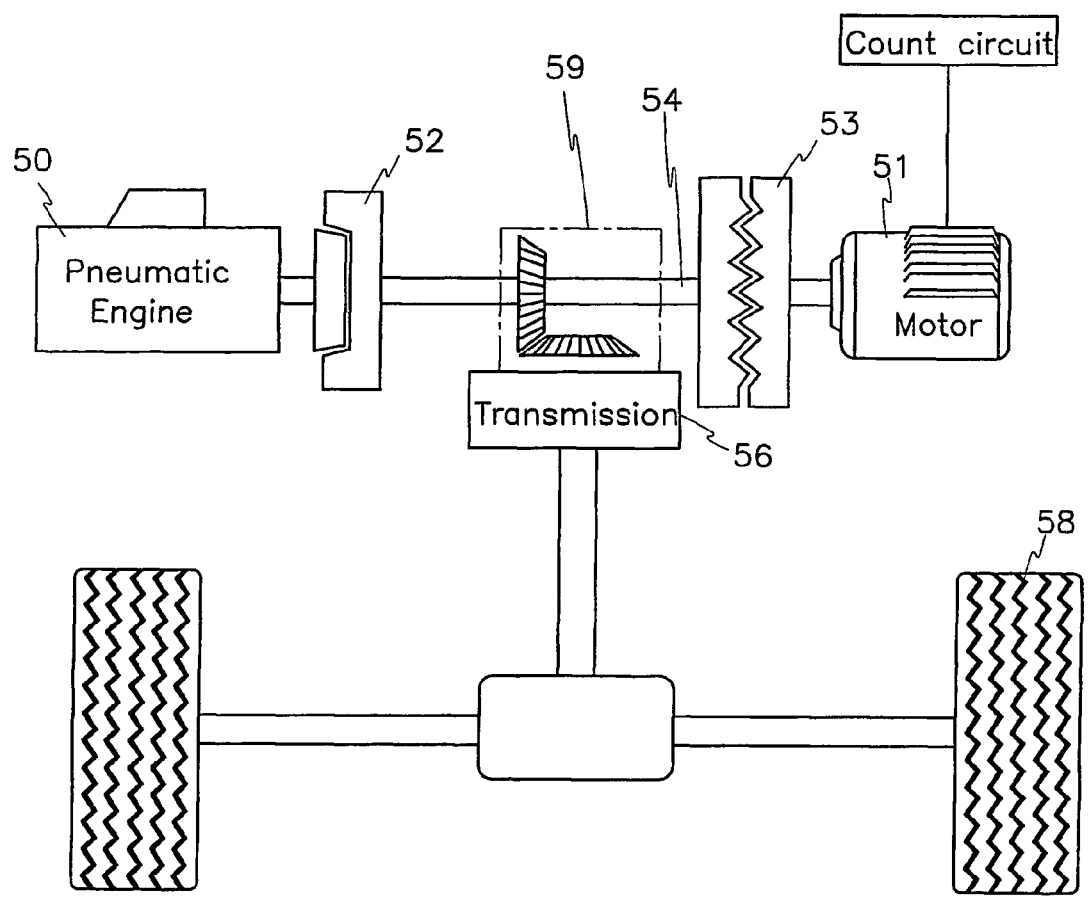
FIG. 3 is a view illustrating another example of a power transmission part depicted in FIG. 2.

As another embodiment of the present invention, it is also possible to directly connect the pneumatic engine part 50 to the motor 51 as shown in FIG. 3.

That is, a first electron clutch 52 is mounted on a side of the pneumatic engine part 50, and a second electron clutch 53 is mounted on a side of the motor 51. The first and second electron clutches 52 and 53 are integrally connected to each other by a rotational shaft 54. Accordingly, the power generated from the pneumatic engine part 50 is transmitted to the motor through the first and second electron clutches 52 and 53. The power generated by the motor 51 is transmitted to a bevel gear 59 through the second electron clutch 53.

That is, the bevel gear 59 is mounted on a middle portion of the rotational shaft 54 and integrally connected to a transmission 56. Accordingly, the power generated from the pneumatic engine part 50 or the motor 51 is transmitted to the rotational shaft 54 and then to a transmission 18 through the bevel gear 59.

FIG. 4 shows an engine control part of a hybrid engine according to a preferred embodiment of the present invention. When a power switch 40 is connected to the electric source 7, the power for driving the motor 25 is applied through the thyristor 35.

The accelerating pedal 11 is connected to the motor. The rpm of the motor is controlled by adjusting the depression of the accelerating pedal 11. That is, the variable resistor 26 is coupled to the accelerating pedal 11. The variable resistor 26 is further electrically coupled to a pulse width setting circuit 31.

In addition, the pulse width setting circuit 31 sets the pulse width in accordance with the difference between the voltage variable value of the variable resistor 26 and the voltage of a 역기전압 detecting circuit 33.

The set pulse width signal is applied to the pulse oscillating circuit 32 and the pulse oscillating circuit 32 generates pulse in accordance with the applied signal. The pulse oscillating circuit 32 is formed of an integrated circuit as a square wave oscillating circuit of about 35 kHz. A ratio of "H" to "L" of the oscillated output wave is variable in a range of 0–100%. The ratio of "H" to "L" is determined by a value of the variable resistor 26.

In addition, the pulse oscillating circuit 32 is designed not to operate when the electron valve 6 is turned to an on-state but designed to operate when the second counter switch 27 is turned to an on-state.

Accordingly, the pulse oscillating circuit 32 adjusts the output of the motor by varying voltage supplied to the motor 25 in accordance with the variation of the pulse width.

The pulse oscillating circuit 32 is electrically coupled to the thyristor 35 controlling electric power supplied from the pulse oscillating circuit 32 in accordance with gate signal voltage. As thyristor 35, IGBT is used.

In the thyristor 35, the current is supplied to the motor according to a ratio of "H" to "L." That is, when the "H" is 100% and the "L" 0%, since the supply of the current becomes maximized, the motor 25 is driven at the highest rpm. In addition, when the "L" is 100% and the "H" is 0%, since the current is cut off, the motor cannot be driven. When each of the "H" and "L" is 50%, since 50% of electric power is supplied, the motor rotates in proportional to the 50%.

The excessive current detecting resistor 36 and the reverse electromotive voltage detecting resistor 37 are connected between the thyristor 35 and the motor 25.

The excessive current detecting resistor 36 detects the current being directed to the motor 25. The reverse electromotive voltage detecting resistor 37 detects reverse electromotive voltage generated when the motor 25 is spontaneously rotated.

The reverse electromotive voltage detecting resistor 37 is connected to the reverse electromotive voltage detecting circuit 33 to detect the reverse electromotive voltage. Generally, the motor 25 may be spontaneously rotated by inertia force or other outer forces even when electric power is not supplied thereto, resulting in the generation of the reverse electromotive voltage. Therefore, when the reverse electromotive voltage is generated, the reverse electromotive voltage detecting circuit 33 detects the reverse electromotive voltage and inputs the detected voltage signal to the pulse width setting circuit 31.

The excessive current detecting circuit 34 detects the excessive current being directed to the motor 25. That is, the excessive current appears on the opposite ends of the reverse electromotive voltage detecting resistor 37 and input to the excessive current detecting circuit 34. In addition, the excessive current detecting circuit 34 is connected to the excessive current detecting circuit 34. Accordingly, when the current above a reference value set in the circuit is directed to the motor 25, a corresponding signal is comparatively amplified to stop the pulse oscillation. When there is no pulse output, a gate signal of the thyristor becomes 0V, thereby preventing the thyristor from being damaged.

As described above, when the motor 25 is operated, the rpm of the motor 25 is detected. When the rpm of the motor 25 reaches the predetermined value, the operation of the pneumatic engine is stopped.

The rpm of the motor 25 is detected by the rpm sensor 12 which is an approach sensor that is disposed in the vicinity of the first or second pulley 19 or 21.

The signal output from the rpm sensor 25 is transmitted to the counter circuit 13 for displaying the rpm.

The rpm of the motor is increased above a predetermined value, the first counter switch 15 is opened to close the electron valve 6. Accordingly, the supply of the air to the pneumatic engine is blocked to stop the operation of the pneumatic engine.

In addition, the second counter switch 27 is turned on, the motor 25 is operated to realize the electric engine mode.

When the rpm reaches a predetermined value, the counter circuit 13 selectively operates the first, second and third transmission switches 41, 42 and 43.

The first transmission switch 41 is opened when the rpm reaches a predetermined value set in the counter circuit 13 and blocks 24V direct voltage of the first electron clutch 17 to disconnect the pneumatic engine part 60 and the transmission 18.

When the power is cut off for the gear shifting of the transmission, the second transmission switch 42 blocks the 24V direct voltage to disconnect the pneumatic engine part 60 and the transmission 18.

When the motor is operated, the third transmission switch 43, the third transmission switch 43 disconnects the motor 25 and the second pulley 21 by blocking the direct voltage of the second electron clutch 23 for the shifting operation of the transmission.

In addition, the first and second temperature detecting sensors 71 and 70 respectively disposed on the motor 25 and the control part 300 make it possible to maintain the optimum temperature.

As another embodiments of the present invention, a variety of algorithms can be added to the control part 300 for the more smooth operation of the PHEE.

Figure 6A:
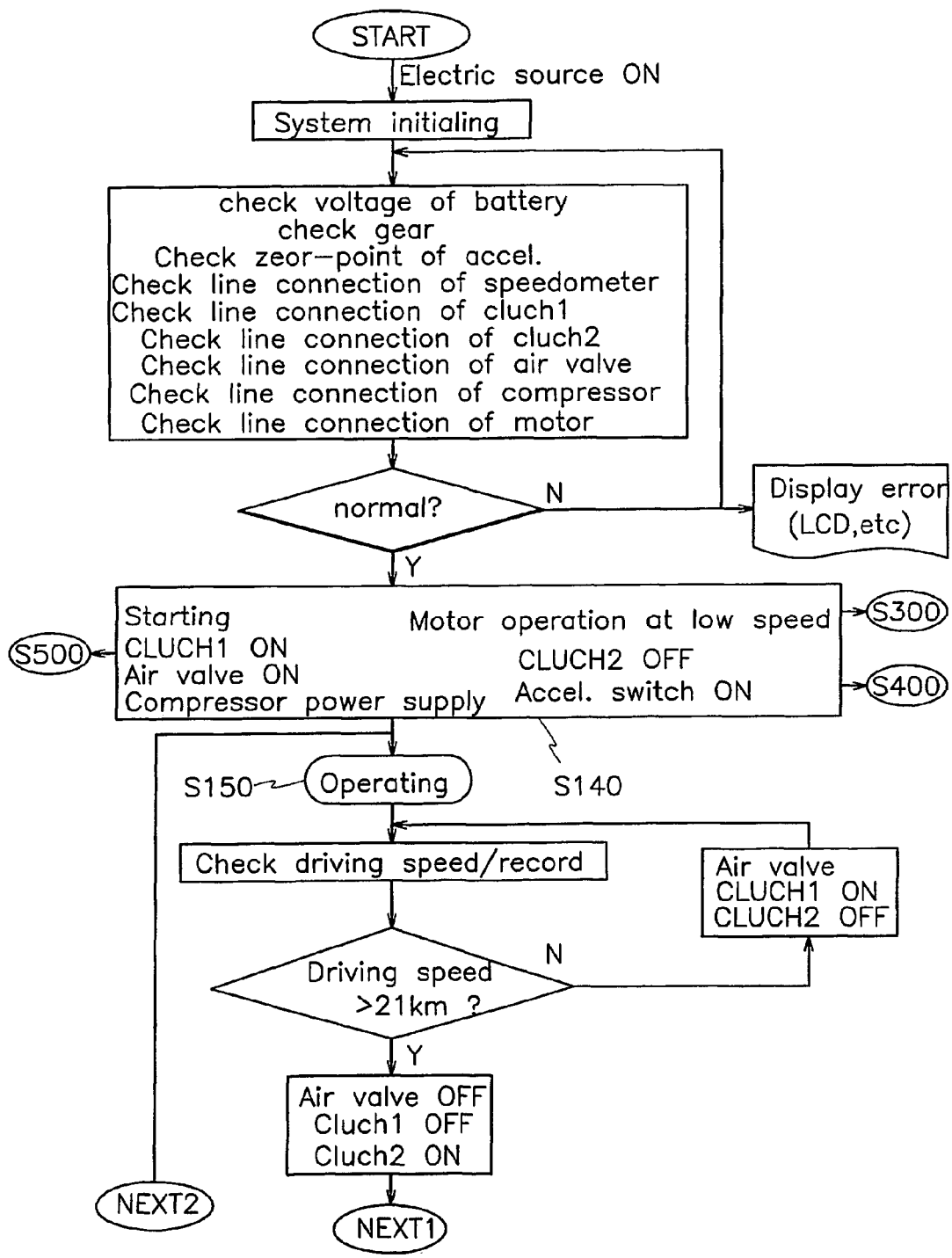
FIGS. 6(a) and 6(b) are flowcharts illustrating the operation of a PHEE with algorithms according to a preferred embodiment of the present invention.
Figure 6B:
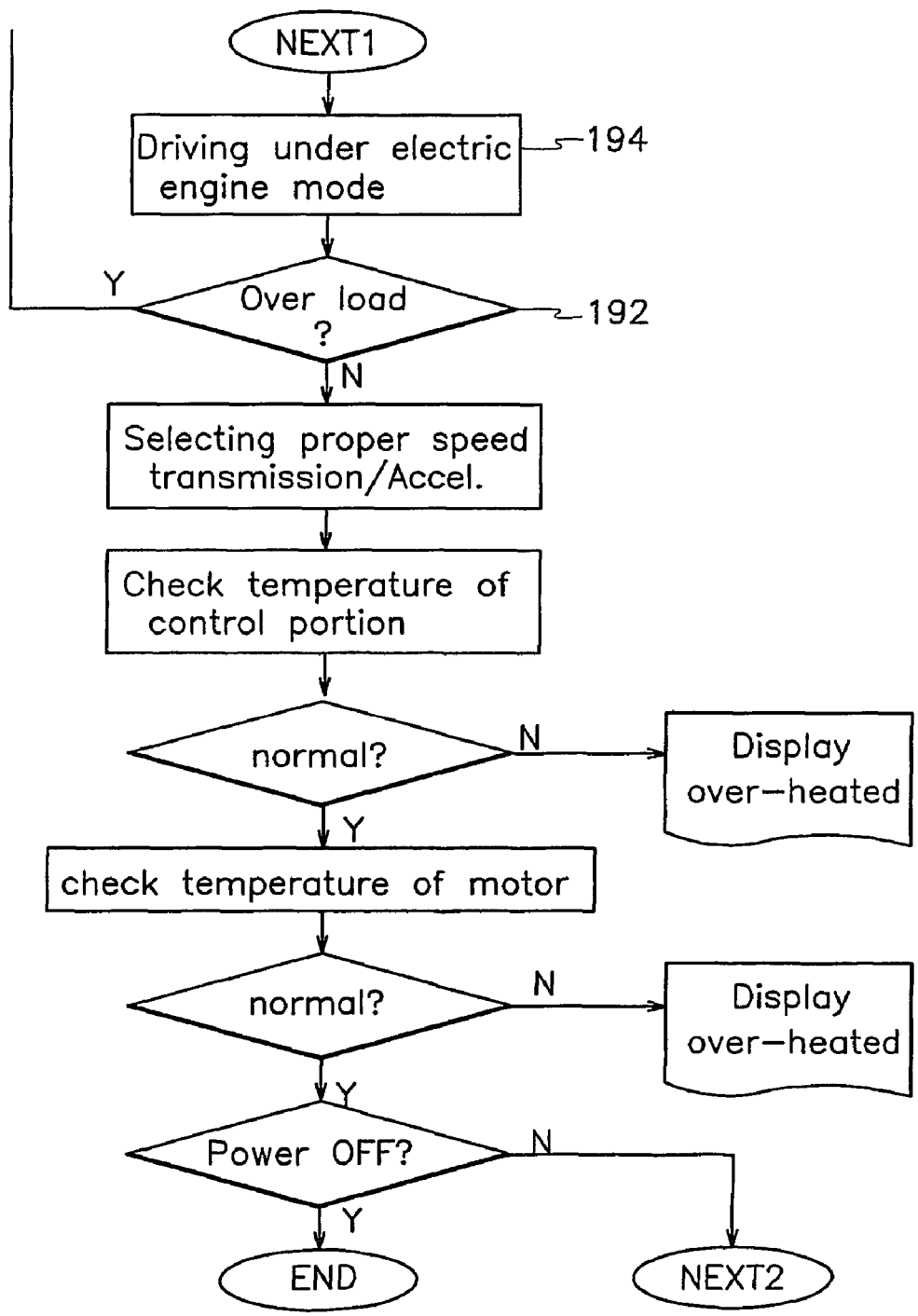

That is, as shown in FIGS. 6(a) and 6(b), a motor balance adjusting algorithm S300 for adjusting the balance of the motor 1 in FIG. 1 and the electric engine motor 25 in FIG. 2 and an electron bridge forming algorithm S400 for stabilizing the voltage applied to the engine, and a drive circuit monitor algorithm S500 for stabilizing current applied to the engine can be further provided.

The operation of the PHEE according to a preferred embodiment of the present invention will be described more in detail.

Figure 5A:
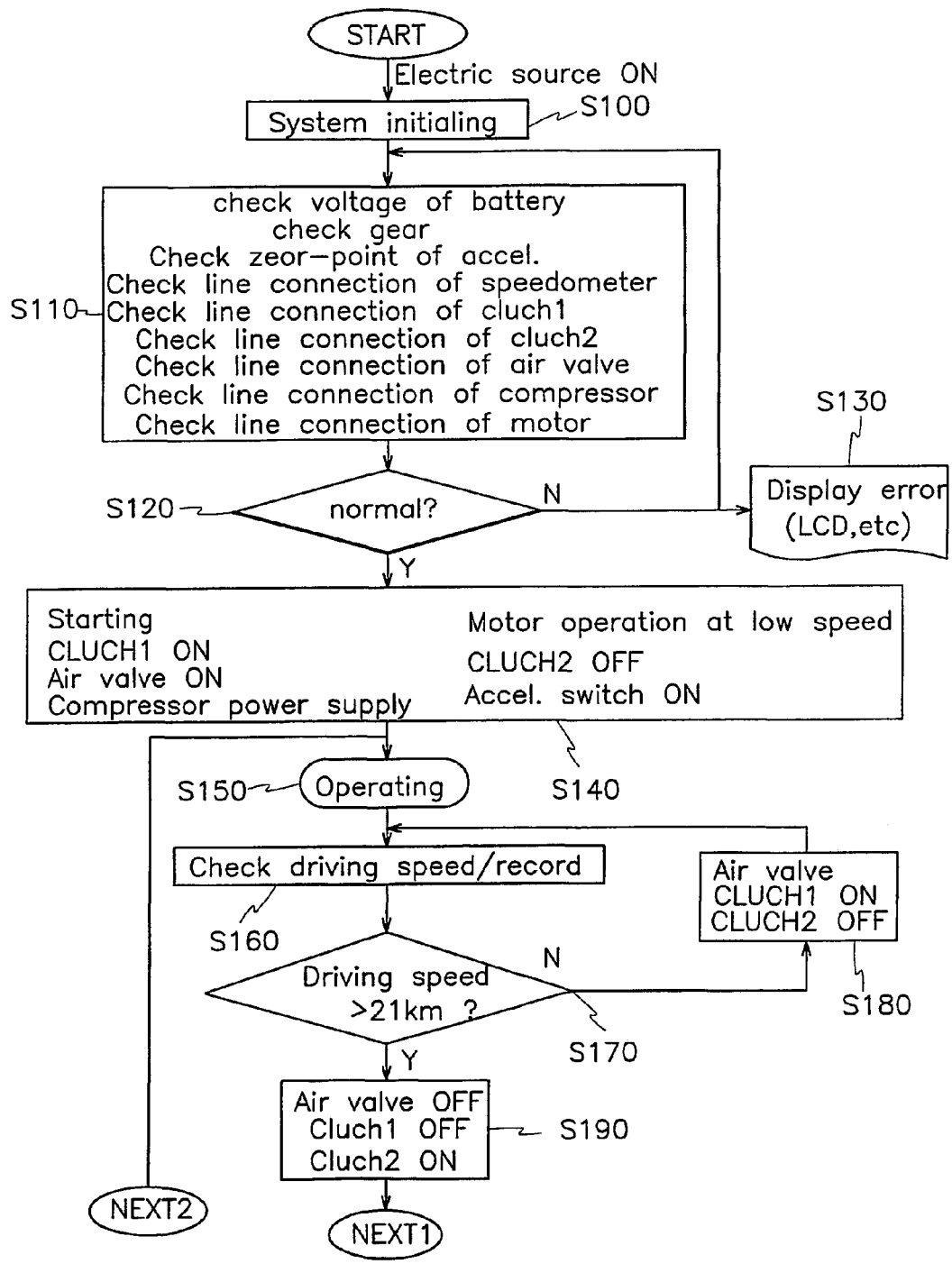
FIGS. 5(a) and 5(b) are flowcharts illustrating the operation of a PHEE according to a preferred embodiment of the present invention.
Figure 5B:
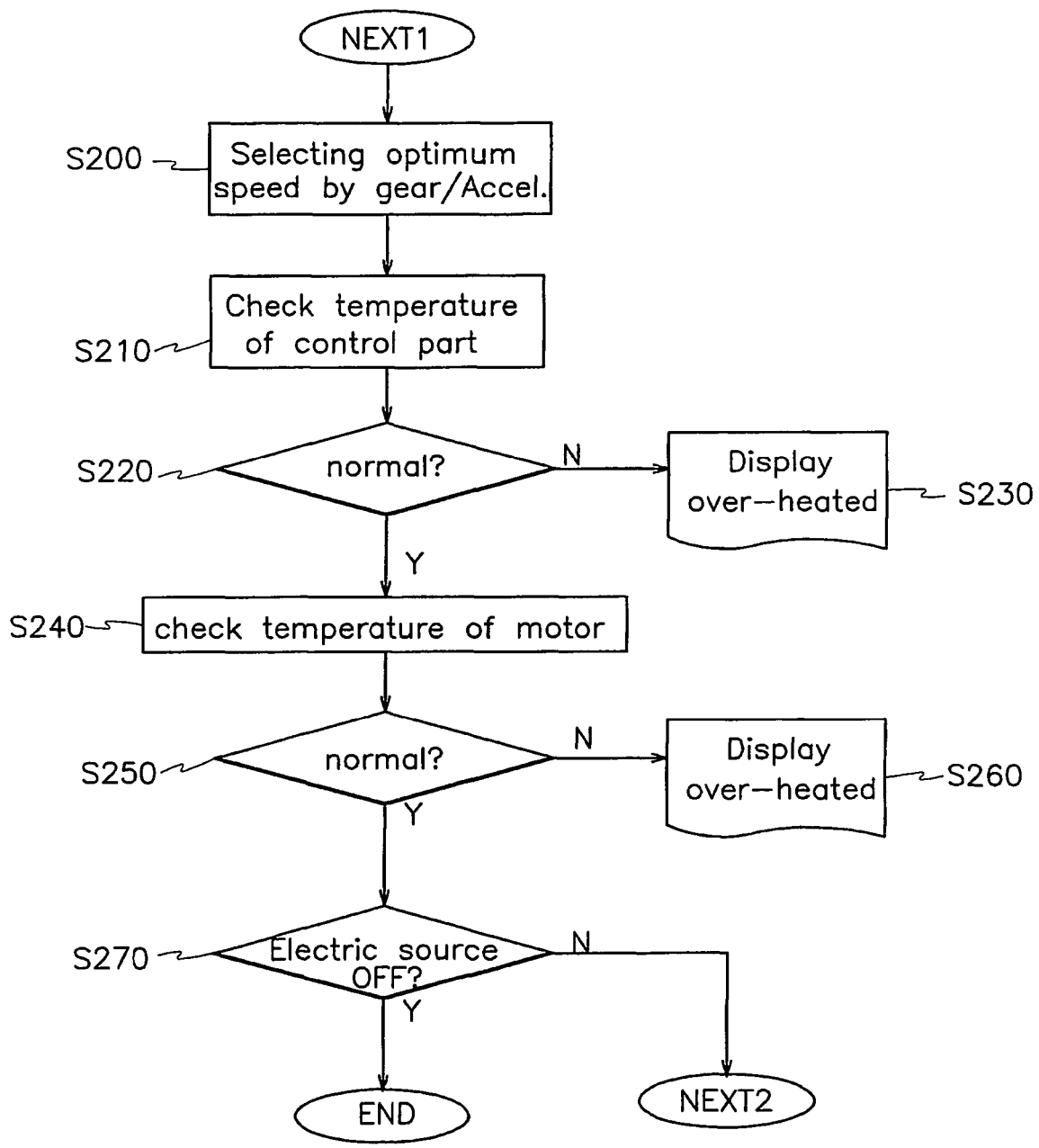

Referring to FIG. 2 trough FIG. 5(b), when a start key is rotated to start a vehicle with the PHEE, the control part 300 initializes the system by receiving electric power from the electric source 7 and monitors the initial state of each part (S100). That is, the control part 300 checks the initial states of each part such as the battery voltage, the gear state, the zero-point of the accelerator, and the line connection states of the tachometer, the first electron clutch, the second electron clutch, the air valve, the compressor, and the driving motor (S110).

After the checking step, the control part 300 determines if all of the initial states are normal (S120), and if not, the control part 300 displays the error state on an LCD screen on an instrument panel or makes an alarming sound (S130).

When all of the initial states are normal, the control part 300 starts the engine (S140). That is, the first electron clutch 17 is applied and the air valve 8 is opened. In addition, by applying electric power to the compressor motor 1, the compressor motor 1 generates the compressed air to be stored in the air tank 5. At this point, when the internal pressure of the air tank 5 becomes higher than a predetermined value, the pressure switch 4 is turned to an off-state to cut off the electric power applied from the electric source 7. Therefore, the operation of the compressor motor 1 is stopped so that no more compressed air is stored in the air tank 5.

The compressed air stored in the air tank 5 is supplied to the pneumatic engine part 60 through the electron valve 6 and the air valve 8 to operate the pneumatic engine part 60. Accordingly, the hybrid engine is operated in the pneumatic engine mode (S150).

In this pneumatic engine mode, the output can be adjusted by operating the accelerating pedal.

That is, since the air valve 8 is connected to the accelerating pedal 11, as the accelerating pedal 11 is operated, the opening of the air valve 8 is varied to adjust the amount of the air introduced into the pneumatic engine part 60, thereby controlling the engine output. At this point, the opening/closing signal of the accelerating pedal is processed in real time so that the engine output can be controlled in real time.

Furthermore, the power generated from the pneumatic engine part 60 is transmitted to the first pulley 19 through the first electron clutch 18 and the transmission 18, and then to the second pulley 21 through the belt 20.

The rotational angle detecting sensor 12 for detecting the rpm of the second pulley 21 is disposed in the vicinity of the second pulley 21. Therefore, when the rpm of the second pulley 21 reaches above a predetermined value as the output of the pneumatic engine part 60 is gradually increased, the motor 25 is operated to switch into the electric engine mode.

As another embodiment, the control part checks and record the vehicle speed (S160) and determines if the vehicle speed is higher than 21 km/h (S170).

When the vehicle speed is less than 21 km/h, the vehicle runs in the pneumatic engine mode (S180), and when higher than 21 km/h, runs in the electric engine mode (S190).

When the vehicle speed is higher than 21 km/h, the control part 300 inputs an electric signal to the counter circuit 13 connected to the first and second counter switches 15 and 27 so as to selectively operate the first and second counter switches 15 and 27.

That is, when the rpm of the motor 25 reaches a predetermined value or the vehicle speed is higher than 21 km/h, the counter circuit 13 controls the first and second counter switches 15 and 27 to an off-state and an on-state, respectively.

Accordingly, the electron valve 6 is closed to stop the operation of the pneumatic engine part 60 and operate the pulse oscillating circuit 32. When the pulse oscillating circuit 32 is operated, electric power is applied to the motor 25 through the thyristor 35, the excessive current detecting resistor 36, and a reverse electromotive voltage detecting resistor 37, thereby operating the motor 25.

At this point, the counter circuit 13 releases the first electron clutch 17 by controlling the first and second transmission switches 41 and 42 to off-states, thereby disconnecting the power transmission between the pneumatic engine part 60 and the transmission 18. At this point, the second electron clutch 23 is applied so that the power generated by the motor 25 can be transmitted to the transmission 18 through the second electron clutch 23, the second pulley 211, the belt 20 and the first pulley 19, thereby realizing the electric engine mode.

In addition, when the accelerating pedal 11 is further operated to increase the vehicle speed in the electric engine mode, the resistance of the variable resistor 26 connected to the accelerating pedal 11 is varied, thereby outputting the enlarged square wave width from the pulse width set circuit 31.

As a result, the voltage applied to the motor 25 is increased to increase the power from the motor shaft.

In addition, an excessive load checking step S192 may be further added as shown in FIG. 6(a). That is, when the excessive load is detected in the motor 25 of FIG. 2, the control part 300 converts the operating mode from the electric engine mode to the pneumatic engine mode.

After the above step, the control part 300 determines the optimum speed by detecting the gear and the accelerator during driving and operates the motor in response to the determined optimum speed (S200). At this point, the temperature of the control part 300 is checked (S210).

The control part 300 determines if it is excessively heated (S220), and when it is excessively heat, the control part 300 displays the error signal on the LCD screen or makes alarming sound (S230).

When the control part 300 is not excessively heated, the control part 300 checks the temperature of the motor 25 (S240), and then determines if the temperature of the motor 25 is over-heated (S250). When the motor is over-heated, the control part 300 displays the error signal on the LCD screen or makes alarming sound. (S260).

When the motor 25 is not over-heated, the control part 300 allows the vehicle to normally drive, and, when the vehicle speed is less than 21 km/h, converts the engine mode in the pneumatic engine mode.

To stop the drive of the vehicle, the control part 300 controls the electric source to an off-state, thereby stopping the operation of the engine (S270).

FIGS. 6(a) and 6(b) shows a method for operating a PHEE according to another embodiment of the present invention. In this embodiment, additional algorithms are further added to the control part.

Figure 7:
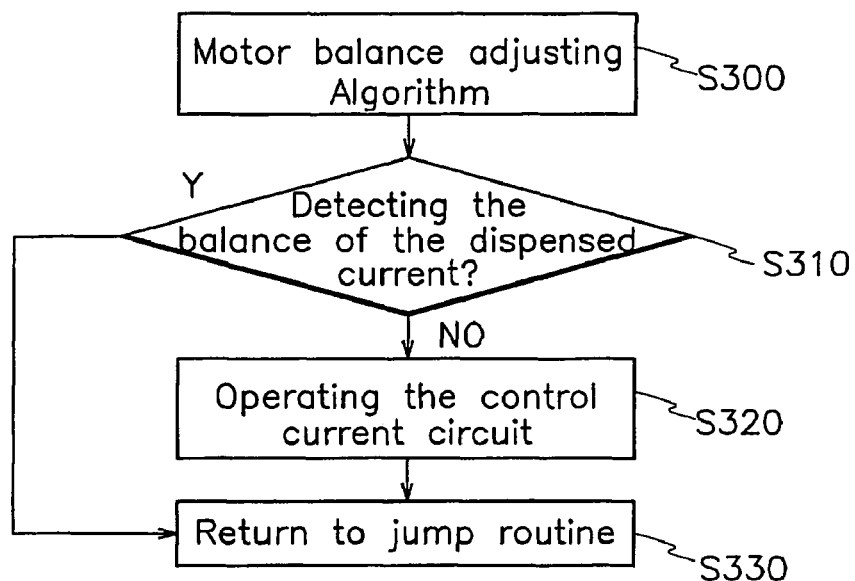
FIG. 7 is a flowchart illustrating a motor balance adjusting algorithm depicted in FIG. 6(a)

That is, as shown in FIGS. 2 and 7, the control part 300 of the PHEE is provided with a motor balance adjusting algorithm S300 so as to control the current dispensed to the motors of the engine. The algorithm comprises the first step S310 of detecting the balance of the current dispensed to the motor 25 for the electric engine and the motor 1 for the compressor. In the second step S320, when the current is not balanced, the second step S320 of adjusting the current balance supplied to the motors by operating the control current circuit is performed. When it is determined that the current is balanced in the first step S310, the control process is returned to its main control routine and the third step S330 of operating the engine is performed.

Figure 8:
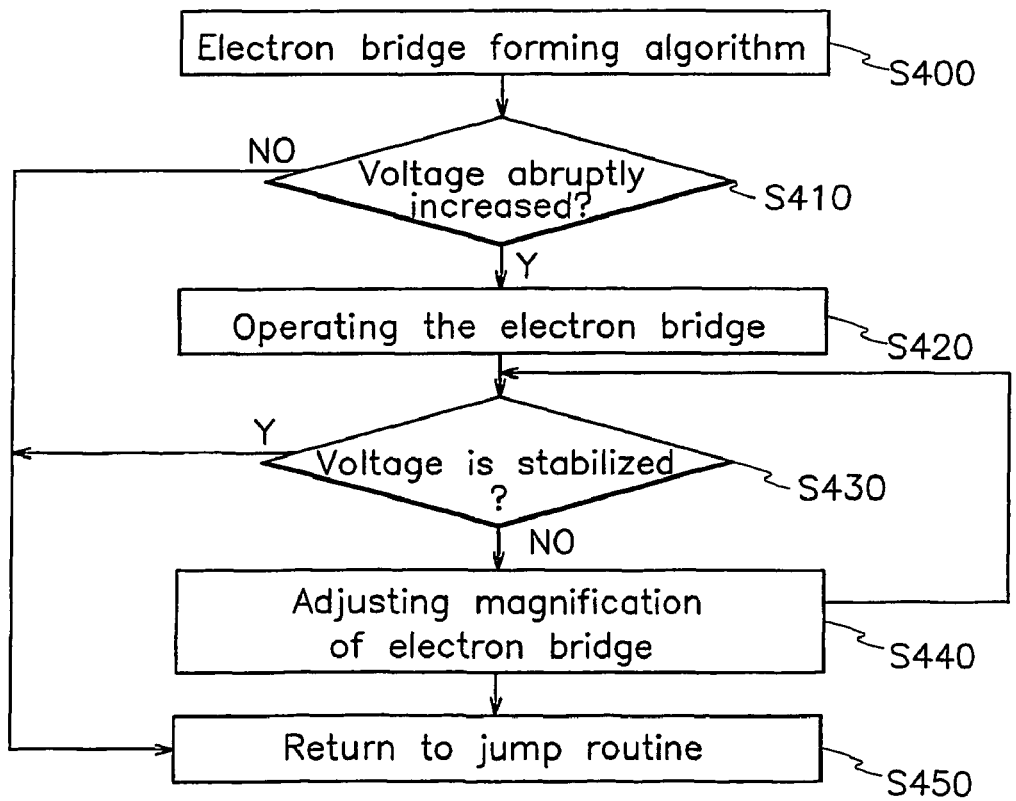
FIG. 8 is a flowchart illustrating an electron bridge forming algorithm for stabilizing voltage depicted in FIG. 6(a)

FIG. 8 shows the electron bridge forming algorithm S400 for stabilizing voltage being directed to the engine. As shown in the drawing, the first step S410 of detecting if the voltage is abruptly increased is performed. When the voltage is abruptly increased, the second step S420 of operating the electron bridge provided on the control part 300, after which the third step S430 of determining if the voltage is stabilized by the operation of the electron bridge is performed. When the voltage is stabilized, the process is returned to its main routine to operate the engine (S450).

When it is determined that the voltage is not stabilized in the third step S430, the magnification of the electron bridge is adjusted (S440) and the process is returned to the second step (S420) to check if the voltage is stabilized by the adjusted electron bridge. This process is repeated by at most 3 times (S430).

When the voltage is stabilized, the process is returned to its main routine (S450). In addition, when it is not determined that the voltage is abruptly increased in the first step S410, the process is directly returned to its jump routine.

Figure 9:
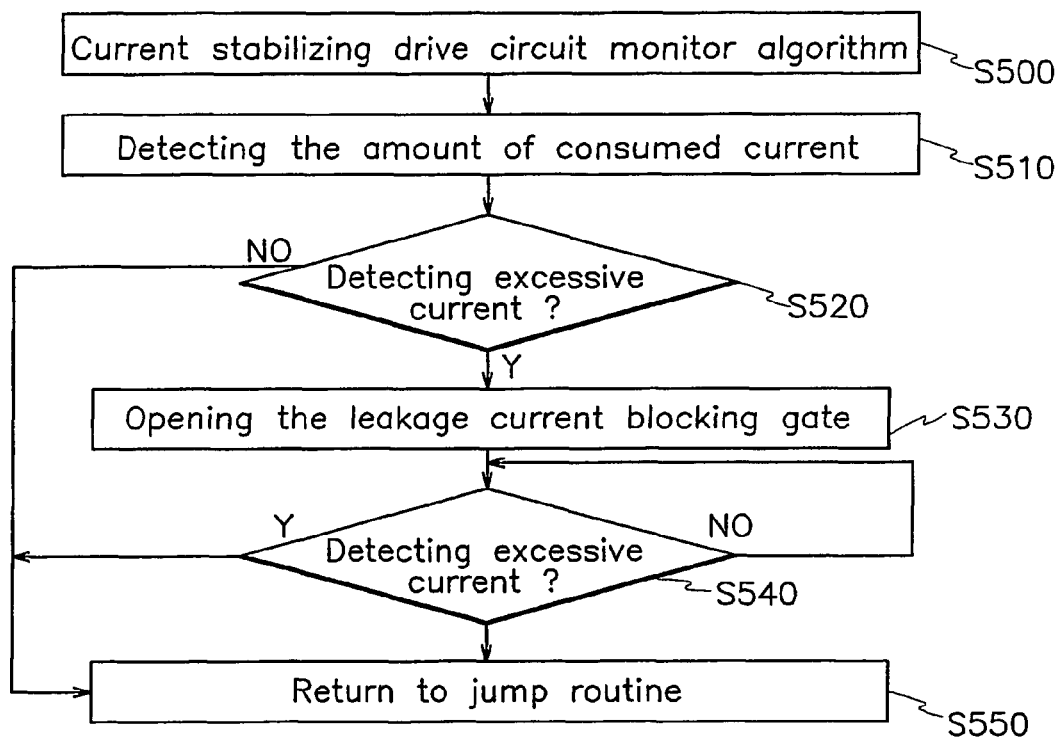
FIG. 9 is a flowchart illustrating a current stabilizing drive circuit depicted in FIG. 6(a).

FIG. 9 shows the current stabilizing drive circuit monitor algorithm S500. As shown in the drawing, the firs step S519 of detecting the amount of current consumed in the engine is performed, and the second step S520 of determining if the detected current is excessive. When it is determined if the detected current is excessive, the third step S539 of opening the leakage current blocking gate is processed, after which the fourth step S540 of determining if the current is normally applied by opening the leakage current blocking gate is performed. When the current is excessively applied, the process is returned to the third step S530 and passes through the leakage current blocking gate. This process is repeated by at most 3 times.

When it is determined that the current is normally applied in the fourth step S540, the process is returned to the jump routine to operate the engine (S550).

As described above, the PHEE of the present invention can be smoothly operated by the variety of algorithms provided in the control part.

In addition, as shown in FIGS. 2, 6(a) and 6(b), after the electron engine mode step 194, the step 192 of determining if the motor 25 is over-loaded may be added.

That is, during the motor operation, when the excessive current is detected in the motor 25, the control part 300 outputs a signal for stopping the electric engine mode and converting the driving mode into the pneumatic engine mode.

In the above description, an example where the inventive PHEE is employed to a vehicle. However, the inventive PHEE may be used for others such as ships.

As described above, the inventive PHEE has advantages as follows.

First, when a large amount of torque is required, the pneumatic engine part is operated, and when the rpm reaches a predetermined value, the electric engine part is operated. Therefore, since fossil fuel is not used, the air pollution problem can be solved.

Second, when the vehicle runs an uphill, the combination of the pneumatic engine and the electric engine can be used to improve the running ability.

Third, the inventive PHEE can be applied to a variety of vehicles such as a car and a ship.

Fourth, since a variety of algorithms are provided, the voltage and current can be stably maintained and the motor is stably balanced, thereby smoothly operating the motors.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A pneumatic hybrid electric engine comprising:
   an electric source;
   an air supply part for compressing air and storing the compressed air, the air supply part being connected to the electric source;
   a pneumatic engine part for generating power using air supplied from the air supply part, the pneumatic engine part being connected to the air supply part;
   an electric engine part for generating power using electric power applied from the electric source;
   a power transmission part for transmitting the power generated by the pneumatic engine part and the electric engine part; and
   a control part for selectively operating the pneumatic engine part and the electric engine part so that the pneumatic and electric engines parts can be switched on the basis of a predetermined torque range.

2. An engine of claim 1 wherein the air supply part comprises a compressor motor connected to the electric source, a compressor operated by the compressor motor, an air tank for storing compressed air generated by the compressor and supplying the compressed air to the pneumatic engine part, a pressure switch for detecting internal pressure of the air tank and controlling the motor in accordance with the detected internal pressure to constantly maintain the internal pressure, an electron valve connected to the control part to control the compressed air exhausted from the air tank, and an air valve connected to the electron valve.

3. An engine of claim 1 wherein the pneumatic engine part comprises a cylinder block, a cylinder reciprocating in the cylinder block by the compressed air from the air supply part, a crankshaft rotated by the reciprocation of the cylinder to generate power, a first electron clutch connected to an end of the crankshaft to selectively connect power an outer side, and a transmission connected to the first electron clutch.

4. An engine of claim 1 wherein the electric engine part comprises a motor connected to the electric source and a second electron clutch mounted on a rotational shaft of the motor for a selective power transmission.

5. An engine of claim 4 wherein the power transmission part comprises a first pulley connected to a transmission of the pneumatic engine part, a second pulley connected to the second electron clutch of the electric engine part, and a belt interconnecting the first and second pulleys.

6. An engine of claim 1 wherein the power transmission part comprises a first electron clutch connected to the pneumatic engine part, a second electron clutch connected to the electric engine part, a rotational shaft interconnecting the first and second electron clutches, and a transmission connected to the rotational shaft by a bevel gear.

7. An engine of claim 5 wherein an rpm sensor for detecting an rpm of the second pulley and transmitting a signal corresponding to the detected rpm to the control part is disposed in the vicinity of the second pulley.

8. An engine of claim 7 wherein the control part comprises a counter circuit for receiving the rpm signal from the rpm sensor, a first counter switch for closing the electron valve when the rpm is less than a predetermined value, and a second counter switch for operating the electric engine part when the rpm is higher than a predetermined value, the second counter switch being connected to the counter circuit.

9. An engine of claim 7 wherein the control part comprises a counter circuit connected to a speed meter to receive a speed signal from the speed meter, a first counter switch coupled to the counter circuit for closing the electron valve when the speed is less than 21 km/h, and a second counter switch coupled to the counter circuit for operating the electric engine part when the speed is greater than 21 km/h.

10. An engine of claim 8 wherein between the second counter switch and the electric engine part, a pulse oscillating circuit for generating a pulse having a predetermined width when the second counter switch is turned to an on-state, a pulse width set circuit connected to the pulse oscillating circuit and varying the width of the pulse, a thyristor for controlling electric power applied to the electric engine part, the thyristor being coupled to the pulse oscillating circuit, an excessive current detecting resistor for detecting current being directed to the motor, a reverse electromotive voltage detecting circuit for detecting reverse electromotive voltage generated when the motor idles and applying the detected voltage to the pulse width set circuit.

11. An engine of one of claims 4 and 8 wherein the control part and the motor are respectively provided with first and second temperature detecting sensors.

12. An engine of one of claim 2 and 10 wherein the air valve of the pneumatic engine part and a variable resistor coupled to the pulse oscillating circuit of the electric engine part are connected to an accelerating pedal, whereby when the accelerating pedal is operated, output of the pneumatic engine part is adjusted by an opening of the air valve and output of the electric engine part is adjusted by the variation of the voltage by the variation of the pulse width generated in the pulse width set circuit in accordance with the variation of the resistance of the variable resistor.

13. An engine of claim 8 wherein the first electron clutch is connect to the counter circuit by first and second transmission switches, and the second electron clutch is connected to the counter circuit by the third transmission switch, whereby in an initial start operation, the first and second transmission switches are turned to on-states to apply the first and second electron clutches so that power of the pneumatic engine part is transmitted to the transmission, thereby, and when a set value of the counter circuit is higher than a predetermined range, the first and second transmission switches are turned to off-states to release the first electron clutch, thereby disconnecting power transmission between the pneumatic engine part and the transmission and operating the electric engine part.

14. A method for controlling a pneumatic hybrid electric engine, comprising the steps of:
   displaying an error state when any one of parts is not normal after checking a battery voltage, a gear, a zero-point of an accelerator, and line states of a first electron clutch, a second electron clutch, an air valve, a compressor, and a compressor driving motor;
   driving the engine in a pneumatic engine mode after 1) solving the abnormal state, 2) applying the first electron clutch, 3) opening the air valve, and 4) supplying compressed air to a pneumatic engine part;

driving the engine in an electric engine mode by 1) operating an electric engine part when the power generated in the pneumatic engine part is transmitted to a first pulley through the first electron clutch and a transmission and to a second pulley through a belt and an rpm of the second pulley is higher than a predetermined value or a vehicle speed is higher than a predetermined value, 2) releasing the first electron clutch, and 3) applying the second electron clutch; and converting the engine drive mode from the electric engine mode to the pneumatic engine mode by 1) determining if the motor is over-loaded, and 2) stopping the electric engine mode by outputting a signal when excessive current is applied to the motor.

15. A method of claim 14 wherein the control part comprises a motor balance adjusting algorithm, an electron bridge forming algorithm for stabilizing voltage, and a drive circuit monitor algorithm for stabilizing current.

16. A method of claim 15 wherein the motor balance adjusting algorithm comprises the steps of:

detecting a balance of current dispensed to a motor for the compressor and a motor for the electric engine;

adjusting the balance of the current by operating a limit current circuit when the current is not balanced;

driving the engine by returning to a jump routine when the current is balanced.

17. A method of claim 15 wherein the electron bridge forming algorithm comprises the steps of:

detecting if voltage is abruptly increased;

operating, when the voltage is abruptly increased, an electron bridge provided in the control part;

determining if the voltage is stabilized by the operation of the electron bridge; and operating, when the voltage is stabilized, the engine by returning a jump routine, wherein when the voltage is not stabilized, the magnification of the electron bridge is adjusted and the process is returned to the step of operating the electron bridge to check again if the voltage is stabilized.

18. A method of claim 15 wherein the drive circuit monitor algorithm comprises the steps of:

detecting an amount of current consumed in the engine;

determining if the detected amount of the current is excessive;

opening a leakage current blocking gate provided in the control part when the detected amount of current is excessive; and checking if current is normally applied by opening the leakage current blocking gate, wherein when it is determined that excessive current is continuously applied in the step of checking, the process is returned to the step of opening when excessive current is continuously applied and when it is determined that the current is normally applied in the step of checking, the process is returned to a jump routine to continuously operate the engine when the current is normally applied.

* * * * *